United States Patent
Jindai et al.

(10) Patent No.: US 7,629,577 B2
(45) Date of Patent: Dec. 8, 2009

(54) FOREIGN MATTER OR ABNORMAL UNSMOOTHNESS INSPECTION APPARATUS AND FOREIGN MATTER OR ABNORMAL UNSMOOTHNESS INSPECTION METHOD

(75) Inventors: Kazuhiro Jindai, Yokohama (JP); Hideto Yokoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 12/036,746

(22) Filed: Feb. 25, 2008

(65) Prior Publication Data
US 2008/0210854 A1 Sep. 4, 2008

(30) Foreign Application Priority Data
Mar. 1, 2007 (JP) .............................. 2007-051586

(51) Int. Cl.
*G01L 1/04* (2006.01)
(52) U.S. Cl. ........................ 250/309; 250/282; 250/281; 73/1.01; 73/81; 73/83; 73/105; 73/862.638; 428/408; 204/192.15
(58) Field of Classification Search .................. None
See application file for complete search history.

(56) References Cited

U.S. PATENT DOCUMENTS

| | | | | |
|---|---|---|---|---|
| 5,470,661 A | * | 11/1995 | Bailey et al. ................. | 428/408 |
| 5,618,389 A | * | 4/1997 | Kreider ................. | 204/192.15 |
| 6,053,034 A | * | 4/2000 | Tsui et al. ..................... | 73/81 |
| 6,817,255 B2 | * | 11/2004 | Haque et al. ............ | 73/862.638 |
| 6,883,367 B2 | * | 4/2005 | Feng et al. .................... | 73/81 |
| 7,107,694 B2 | * | 9/2006 | Yang et al. .................... | 33/18.1 |
| 7,348,571 B2 | * | 3/2008 | Ue ......................... | 250/442.11 |
| 7,451,636 B2 | * | 11/2008 | Bradshaw et al. .............. | 73/83 |

FOREIGN PATENT DOCUMENTS

| | | |
|---|---|---|
| JP | 60-218845 | 11/1985 |
| JP | 11-23481 | 1/1999 |
| JP | 2004-107192 | 4/2004 |

* cited by examiner

*Primary Examiner*—David A. Vanore
(74) *Attorney, Agent, or Firm*—Fitzpatrick, Cella, Harper & Scinto

(57) ABSTRACT

A foreign matter or abnormal unsmoothness inspection apparatus is constituted by a detecting member for detecting a foreign matter or abnormal unsmoothness by measuring smoothness of a surface of a substrate-like measuring object, a marking device for providing an dent on the surface of the measuring object with a predetermined horizontal distance from the foreign matter or abnormal unsmoothness, and a mass spectrum measuring device for measuring a mass spectrum of secondary ion emitted from a position with a predetermined distance from the dent by detecting the dent through impact and scanning of the surface of the measuring object with a primary ion beam.

9 Claims, 3 Drawing Sheets

(a)

FOREIGN MATTER AND TEST OBJECT (b)

TEST OBJECT (c)

FOREIGN MATTER

FOREIGN MATTER OR ABNORMAL UNSMOOTHNESS INSPECTION APPARATUS AND FOREIGN MATTER OR ABNORMAL UNSMOOTHNESS INSPECTION METHOD

FIELD OF THE INVENTION AND RELATED ART

The present invention relates to a foreign matter or abnormal unsmoothness inspection apparatus for identifying a position of a foreign matter deposited on or abnormal unsmoothness at a surface of a wafer, a glass substrate or the like and analyzing a composition of the foreign matter or abnormal unsmoothness, particularly a foreign matter or abnormal unsmoothness inspection apparatus capable of detecting a foreign matter or abnormal unsmoothness of 1 μm or less. The present invention also relates to a foreign matter or abnormal unsmoothness inspection method using the foreign matter or abnormal unsmoothness inspection apparatus.

In the case where minute dust deposited on a surface of a substrate such as a wafer or the like or a defect of minute wiring on the substrate is detected, Japanese Laid-Open Patent Application (JP-A) Sho 60-218845 discloses an inspection apparatus for analyzing a foreign matter or abnormal unsmoothness through a scanning microscope on the basis of positional information obtained by detecting the foreign matter or abnormal unsmoothness together with coordinate information through an optical means using a phototransmitter/photoreceptor.

A laser beam of the optical means used for detecting the foreign matter or abnormal unsmoothness has a spot diameter of several tens of micrometers, whereas the scanning microscope has a spot diameter of as small as about 0.1 μm, so that it takes a long time to aim a scanning beam at the foreign matter or abnormal unsmoothness. Further, in order to take a sight of an analyzer or the like at a minute object on a measuring (test) object, it is necessary to ensure positional reproducibility with the same accuracy as a size of the minute object with respect to an XY stage for mounting thereon the measuring object. Therefore, it takes a time to move the XY stage, so that it takes a long time to detect a substrate of, e.g., 200 nm×300 nm. For this reason, e.g., an apparatus capable of automatically adjusting, by a feedback control apparatus, a detection position and an observation position of a scanning electron microscope (SEM) or the like through detection of a minute object on a sample with scattered light of spot diameter-adjusted laser beam is described in JP-A Hei 11-23481.

In such a minute object analyzer, an efficiency of observation and analysis of the minute object is improved. However, generally, an optical detecting means such as a laser beam oar the like has a diffraction limit in a wavelength range (region), so that a substantially detectable size of the minute object is about 1 μm. It is difficult to ensure a spatial resolution of submicrons even when coherent light or the like is utilized. Further, accuracy of alignment of the detection position of the minute object with the observation (or analysis) position of the minute object depends on a mechanical mechanism. For this reason, accuracy of submicrons is less expected, so that it is difficult to identify a position of the minute object of 1 μm or less. The position identification of the minute object of 1 μm or less by the SEM or the like is easy but it is necessary to effect electroconductive treatment at a surface of a sample when the sample is an organic sample which is easily charged electrically, so that it is difficult to utilize a time-of-flight secondary ion mass spectrometer (TOF-SIMS) useful for analysis of the organic minute object. Further, with respect to the minute object of 1 μm or less, an intermolecular force is dominant, so that a collecting operation is very difficult. Even if the minute object can be collected, it is further difficult to fix the minute object at a desired position.

Incidentally, a nanoindenter used for fine processing has a triangular-pyramid-like indenter and is capable of processing with a depth of several nanometers by loading an object with the indenter. A method in which a catalyst is formed at a dent of several nanometers on a substrate by using the nanoindenter of this type and at the dent, carbon nanotube is grown at the dent is described in JP-A 2004-107192.

SUMMARY OF THE INVENTION

A principal object of the present invention is to provide a foreign matter or abnormal unsmoothness inspection apparatus and a foreign matter or abnormal unsmoothness inspection method which are capable of reliably detecting a foreign matter or abnormal unsmoothness on the order of submicrons on a substrate-like measuring object together with its positional information and efficiently performing analysis with reliability without specifying and analyzing after collecting the foreign matter or abnormal unsmoothness from the measuring object. Particularly, an object of the present invention is to provide a foreign matter or abnormal unsmoothness inspection apparatus and a foreign matter or abnormal unsmoothness inspection method which are capable of performing detection and analysis of a minute organic foreign matter or abnormal unsmoothness.

The present inventors have found that it is possible to analyze the foreign matter or abnormal unsmoothness in such a manner that the foreign matter or abnormal unsmoothness on the surface of the measuring object is detected by measuring a degree of smoothness (or irregularity) of the surface of the measuring object such as a substrate and a dent is formed at a predetermined (specific) position distant from the foreign matter or abnormal unsmoothness and thereafter a mass spectrum is obtained at a predetermined position distant from the dent by a mass spectrum measuring means. Based on such findings, the present inventors have accomplished foreign matter or abnormal unsmoothness inspection apparatus, according to the present invention, capable of analyzing the foreign matter or abnormal unsmoothness on the order of submicrons in a short time.

According to an aspect of the present invention, there is provided a foreign matter or abnormal unsmoothness inspection apparatus comprising:

detecting means for detecting a foreign matter or abnormal unsmoothness by measuring smoothness of a surface of a substrate-like measuring object;

marking means for providing a dent on the surface of the measuring object with a predetermined horizontal distance from the foreign matter or abnormal unsmoothness; and mass spectrum measuring means for measuring a mass spectrum of secondary ion emitted from a position with a predetermined horizontal distance from the dent by detecting the dent through impact and scanning of the surface of the measuring object with a primary ion beam.

According to another aspect of the present invention, there is provided a foreign matter or abnormal unsmoothness inspection method comprising:

a detecting step of detecting a foreign matter or abnormal unsmoothness by measuring smoothness of a surface of a substrate-like measuring object;

a marking step of providing a dent on the surface of the measuring object with a predetermined horizontal distance from the foreign matter or abnormal unsmoothness; and a mass spectrum measuring step of measuring a mass spectrum of secondary ion emitted from a position with a predetermined horizontal distance from a dent by detecting the dent through impact and scanning of the surface of the measuring object with a primary ion beam.

The foreign matter or abnormal unsmoothness inspection apparatus and foreign matter or abnormal unsmoothness inspection method according to the present invention are capable of reliably detecting a foreign matter or abnormal unsmoothness on the order of submicrons on a substrate-like measuring object together with its positional information and efficiently performing analysis with reliability without specifying and analyzing after collecting the foreign matter or abnormal unsmoothness from the measuring object. Particularly, the foreign matter or abnormal unsmoothness inspection apparatus and foreign matter or abnormal unsmoothness inspection method of the present invention are capable of performing detection and analysis of a minute organic foreign matter or abnormal unsmoothness with reliability.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
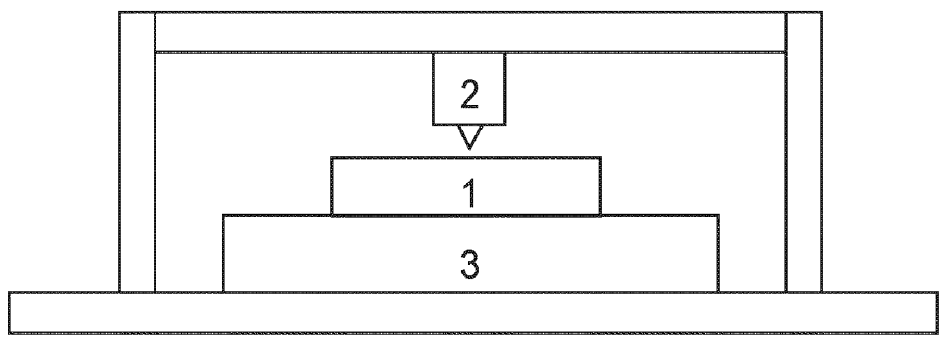
FIG. 1 is a schematic view showing an embodiment of a marking means of the foreign matter or abnormal unsmoothness inspection apparatus according to the present invention.

A measuring object as an object to be inspected in the foreign matter or abnormal unsmoothness inspection apparatus according to the present invention is a substrate-like member of an inorganic material or an organic material and has a macroscopic flat surface. More specifically, the measuring object may include a semiconductor wafer, a glass substrate, and the like. A foreign matter or abnormal unsmoothness on the measuring object surface may be any of an inorganic material and an organic material. The foreign matter or abnormal unsmoothness as the object to be inspected may be not only a material different from the measuring object but also a material which is identical to the material for the measuring object and has a projection larger than a degree of smoothness of the surface of the measuring object. A size of the foreign matter or abnormal unsmoothness may be any size so long as the size exceeds the degree of smoothness of the surface itself. If the foreign matter or abnormal unsmoothness has a spherical or semi-spherical shape, it is possible to cover a foreign matter or abnormal unsmoothness with a submicron diameter of less than 1 μm. In the following, the term "foreign matter or abnormal unsmoothness" is inclusively referred simply to as "foreign matter".

As the detecting means for detecting the foreign matter used in the foreign matter inspection apparatus of the present invention, it is possible to use means capable of measuring the (degree of) surface smoothness of the substrate-like smoothness. Specifically, a scanning electron microscope (SEM), a reflection electron microscope, an ion microscope, an automatic force microscope (AFM), an electric force microscope (EFM), a magnetic force microscope (MFM), and the like are applicable. The scanning electron microscope (SEM) irradiates the measuring object with an electron beam and detects a secondary electron, a reflection electron, a transmission electron, X-ray, fluorescence, internal electromotive force, or the like emitted from the measuring object. The ion microscope obtains an image of the measuring object surface by using an ion, such as proton, helium ion, lithium ion, instead of an electron in the electron microscope. The atomic force microscope (AFM) is a type of the scanning electron microscope and obtains an image of the surface smoothness (irregularity) of the measuring object by measuring an atomic force exerted between a cantilever (probe) and the measuring object from a vertical direction of the probe. In the case where the measuring object is formed of the inorganic material, although the scanning electron microscope or the like may also be used, the atomic force microscope utilizing the atomic force is particularly preferred since it permits measurement in the air, small apparatus size, and measurement without performing electroconductive coating even when the measuring object is formed of an insulating material. Such an atomic force microscope may include those performing detection of the surface in a contact mode, a non-contact mode, a tapping mode, and the like.

In a contact mode microscope, a probe is provided on a stage, having a cylindrical shape or the like, for mounting thereon the measuring object, and a flat plate-like portion at a probe tip is irradiated with laser light. Reflected laser light is measured at a center of a quadrant (four-element) or dual (two-element) photodiode. When the probe is brought near to the measuring object surface, the probe is attracted to the measuring object surface, so that the probe is deformed and contacts the measuring object surface. Due to this deformation, an angle of the reflected light is changed, so that a difference in photoelectromotive force between divided areas of the photodiode is caused to occur. The probe or the stage is vertically moved in z-axis direction, so as to keep the difference in photoelectromotive force at a constant value (i.e., keep a displacement of the probe at a constant value) by using a feedback circuit, while being moved in XY directions, thus performing scanning of the entire surface of the measuring object. Based on control signals for movement in XYZ directions, an image of the measuring object surface is obtained.

In a non-contact mode atomic force microscope, the probe is positioned in the neighborhood of the measuring object surface with a distance of several nanometers from the measuring object surface while being oscillated vertically by a piezoelectric element, and an atomic force between the measuring object and the probe is measured. Scanning of the entire surface of the measuring object is performed by vertically moving the probe or the stage in the z-axis direction, while moving the probe or the stage in the XY directions, so as to keep the atomic force at a constant level by using the feedback circuit. Based on control signals for movement in the XYZ directions, an image of the measuring object surface is obtained. The non-contact mode atomic force microscope effects detection in a non-contact state and therefore breakage of the measuring object by the probe can be prevented, thus being particularly suitable as the foreign matter detecting means used in the present invention.

In a tapping mode atomic force microscope, the probe is vertically moved at the measuring object surface in a jumping manner to measure smoothness of the surface. This atomic force microscope has a high resolving power and is capable of performing accurate measurement, measurement in a liquid, and measurement of a breakable measuring object.

As the marking means used for the foreign matter inspection method of the present invention, any means which recognizes a horizontal distance from the foreign matter and provides a dent at the measuring object surface can be used but it is preferable that a nanoindenter is used. The nanoindenter has a probe (indenter) having a tip diameter of 0.1-1 µm. This probe or the measuring object is moved in a vertical direction so that the measuring object is loaded with the probe into a depth of several tens of nanometers to several microns. Thereafter, the loading is removed and a dent is provided to the measuring object surface to be subjected to measurement of Young's modulus. The nanoindenter includes the probe to be indented, an indenter drive portion for driving the probe in the vertical direction, a displacement measuring portion for measuring a displacement of the probe in the vertical direction, a load measuring portion for measuring a load between the probe and the measuring object, a positioning portion for positioning a (mounting) stage for mounting thereon the measuring object, and the like. As the probe, it is preferable that a material having a hardness higher than that of the measuring object surface is used. For example, a diamond probe applicable to measuring objects of any materials may preferably be used.

In such a nanoindenter, when a foreign matter on the measuring object surface is detected together with positional information about the foreign matter on the stage such as an XY stage or the like, the stage is horizontally moved so that the probe is located above a predetermined (specific) position of the measuring object. A predetermined position at which the probe is located may preferably be such a position that the probe is included together with the foreign matter within a scanning range of a primary ion beam used for a mass spectrum measuring means described later. Specifically, the predetermined position of the probe may be a position above a position within the scanning range of the primary ion beam used for the mass spectrum measuring means or a position above a peripheral edge portion or the like outside a foreign matter detection area of the measuring object. A horizontal movement distance of the stage at this time is recognized, so that a horizontal distance between the probe and the foreign matter is recognized and stored. The probe or the stage for the measuring object is moved in the vertical direction, so that the probe tip is pressed into the measuring object surface so as to form the dent at the measuring object surface. as a shape of the dent formed on the measuring object, the probe tip may have various shapes such as a triangular shape, a quadrangular pyramid shape, a conical shape, and the like, so that the dent is formed in a shape corresponding to the tip shape of the probe. For example, in the case where the probe tip has the conical shape, the dent may have a diameter of 1-10 µm and a depth of 1-5 µm. A size and the shape of the dent formed on the measuring object are not particularly limited so long as the dent is recognizable by a time-of-flight secondary ion mass spectrometer described later. The horizontal distance between the dent on the measuring object and the foreign matter corresponds to the horizontal distance between the probe and the foreign matter.

Figure 4:
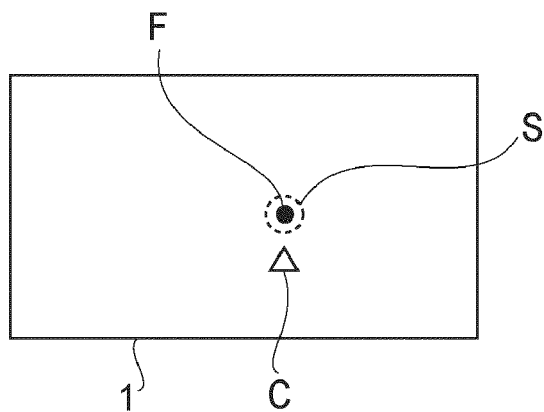
FIG. 4 is a schematic view for illustrating a method for obtaining a mass spectrum of a foreign matter or abnormal unsmoothness in the foreign matter or abnormal unsmoothness inspection apparatus of the present invention.

As an example of the above-described nanoindenter, a nanoindenter shown in FIG. 1 may be employed. The nanoindenter shown in FIG. 1 includes an XYZ stage 3 for mounting thereon a measuring object 1 and a nanoindent probe 2. The XYZ stage for mounting the measuring object is moved in XY directions so that a position for forming dent (C shown in FIG. 4) on the measuring object is located immediately under the nanoindent probe. An amount of movement at this time of the XYZ stage in the XY directions is recognized and a horizontal distance from a foreign matter (F shown in FIG. 4) detected by a detecting means is stored. Further, the XYZ stage is raised in Z direction until the nanoindent probe tip reaches a predetermined depth position from the measuring object surface to form the dent at the measuring object surface.

The mass spectrum measuring means used in the foreign matter inspection apparatus of the present invention impacts and scans the measuring object surface with a primary ion beam to obtain a mass spectrum of secondary ion emitted from the foreign matter on the measuring object. The mass spectrum measuring means can detect a portion having a different electric field distribution as the dent since secondary ions emitted from the dent are diffused at a detecting portion for detecting secondary ions emitted from the measuring object and therefore an amount of ions collected by the detecting portion is largely lowered. From the position of the detected dent, a position of the foreign matter located with the recognized and stored horizontal distance from the dent is obtained and by using a mass spectrum of secondary ion obtained from the position, it is possible to efficiently perform identification and analysis of the foreign matter.

In such a mass spectrum measuring means, in the case where the foreign matter to be detected is assumed to be spherical or semi-spherical, a spot diameter of the primary ion beam may preferably be smaller than a diameter of the foreign matter since extraction of information as the mass spectrum desired from the foreign matter is easy. In the case where the spot diameter of the primary ion beam is larger than the diameter of the foreign matter, it is possible to extract a mass spectrum obtained by differential analysis between a mass spectrum from a peripheral portion containing no foreign matter and a mass spectrum from the foreign matter position. The spot diameter of the primary ion beam may, e.g., be 0.1-1 µm. It is preferable that metal for such a primary ion beam is any of gold, bismuth, gallium, indium, and germanium since ion sources using these metals are commercially available as a liquid metal ion gun (LMIG) capable of easily decreasing the spot diameter of the primary ion beam.

The above-described mass spectrum measuring means may preferably be provided with a data processing mechanism for performing identification of the foreign matter from the mass spectrum. Examples of the data processing mechanism may include apparatuses for performing peak analysis of the mass spectrum, comparison processing with a reference sample, arithmetic processings or the like such as differential-integral processing of peaks, function processing of peaks, and the like.

Example of the mass spectrum measure means may specifically include a magnetic field mass spectrometer, quadruple secondary ion mass spectrometer, time-of-flight secondary ion mass spectrometer (TOF-SIMS), etc. A measuring mode may be either of a dynamic mode in which the measuring object is measured destructively while being cut and a static mode in which the measuring object is measured nondestructively but the static mode effecting the nondestructive measurement is preferred. In the case where the scanning microscope as the foreign matter detecting means, the scanning microscope is also applicable to the mass spectrum measuring means. As the mass spectrum measuring means, the time-of-flight secondary ion mass spectrometer as a type of the static mode mass spectrum measuring means is preferred.

Figure 2:
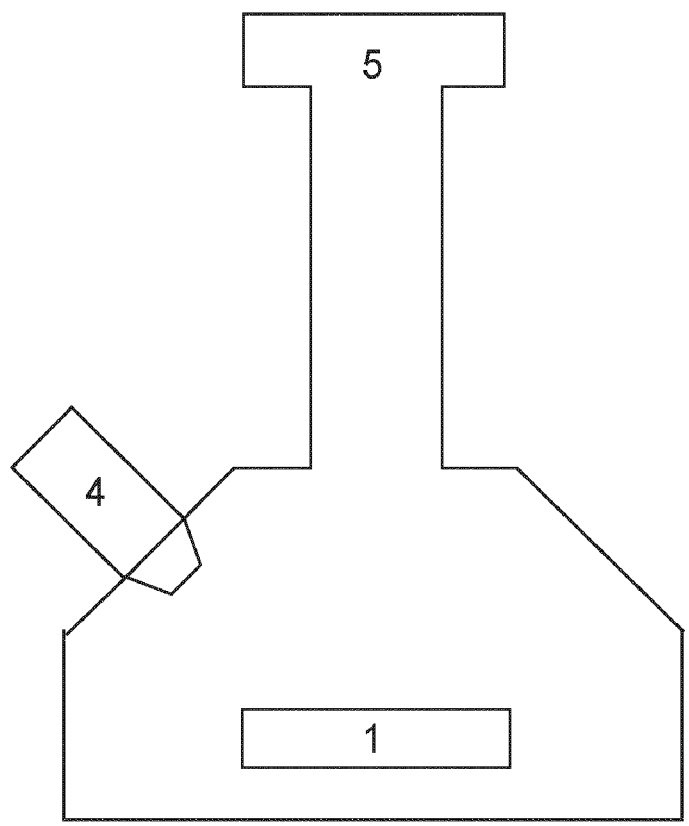
FIG. 2 is a schematic view showing an embodiment of a mass spectrum measuring means of the foreign matter or abnormal unsmoothness inspection apparatus of the present invention.

As an example of the time-of-flight secondary ion mass spectrometer, it is possible to use a time-of-flight secondary ion mass spectrometer shown in FIG. 2. The time-of-flight secondary ion mass spectrometer shown in FIG. 2 includes an ion gun 4 for impact on a measuring object 1 with primary ions and a detector 5 for detecting a time of flight of secondary ions emitted from the surface of the measuring object by the primary ionimpact. In addition, the time-of-flight secondary ion mass spectrometer includes a scanning apparatus for scanning the measuring object surface with the primary ions, a leading electrode for accelerating the secondary ions emitted from the measuring object surface, and the like (not shown). The ion gun emits ions of gold, bismuth, gallium, indium, germanium, or the like as an ion beam-like pulse. The spot diameter of the ion beam is adjusted so as to be smaller than an estimated diameter of the foreign matter and the ion beam successively scans and impacts the measuring object surface with the ion beam in XY directions. The measuring object surface is bombarded with the ions emitted from the ion gun to break molecules, so that fragments and ionized molecules are emitted as secondary ions. A flying speed of the secondary ions collected by the detector depends on mass of the ions, so that the mass spectrum of the secondary ions is obtained from a time until the secondary ions reach the detector to identify the molecules or the molecule fragments. An energy distribution of the secondary ions lowers mass resolving power, so that it is also possible to improve the mass resolving power by converging the ions at an electrostatic field in order to decrease energy aberration.

Figure 3:
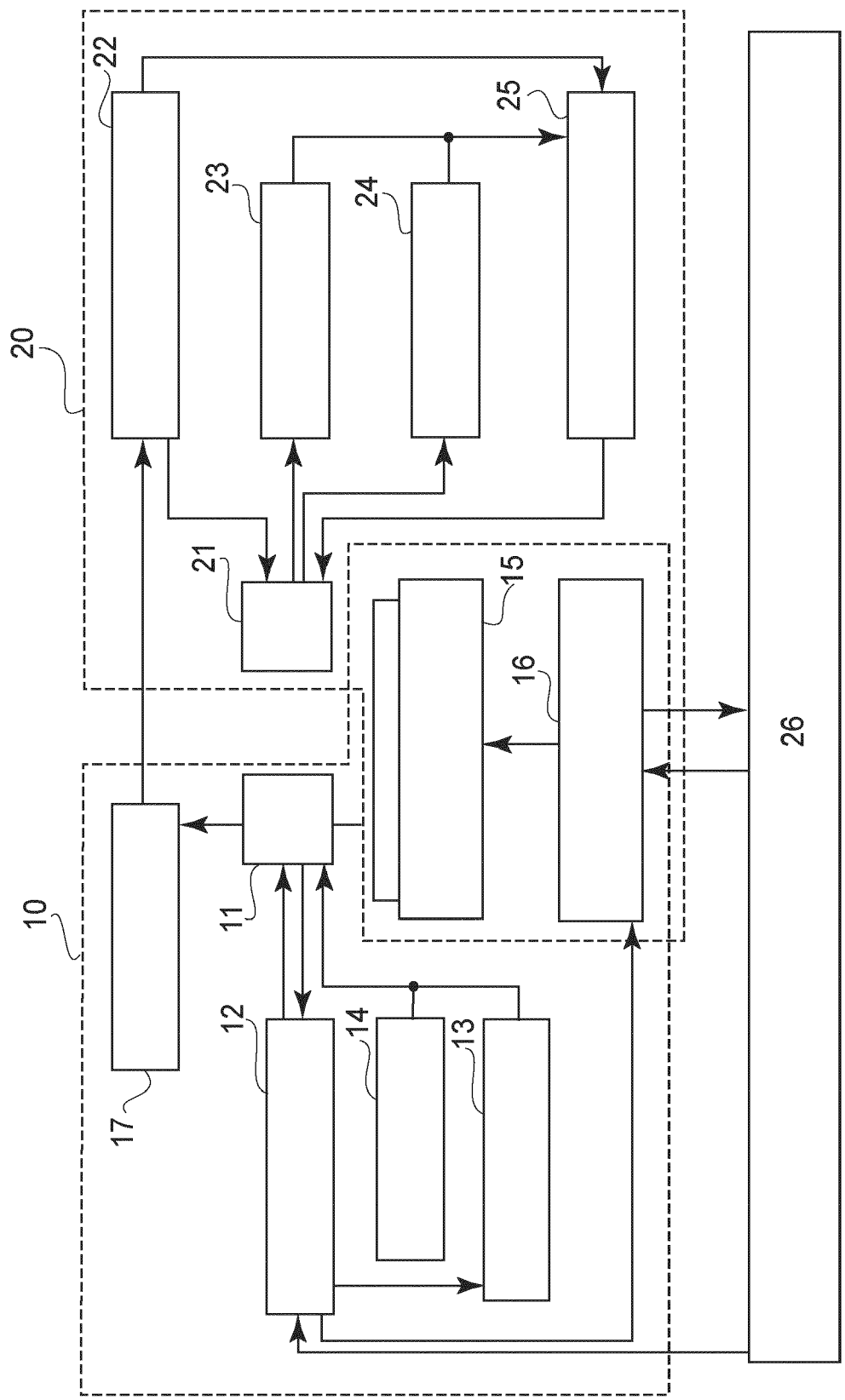
FIG. 3 is a schematic diagram showing an embodiment of the foreign matter or abnormal unsmoothness inspection apparatus of the present invention.

As an embodiment of the foreign matter inspection apparatus described above, it is possible to employ a foreign matter inspection apparatus shown in a constitutional diagram of FIG. 3. The foreign matter inspection apparatus shown in FIG. 3 includes an atomic force microscope (AFM) 10 as a detecting means, a nanoindenter 20 as a marking means, and a time-of-flight secondary ion mass spectrometer (not shown). The atomic force microscope 10 includes a cantilever 11, a frequency measuring portion 12, a feedback circuit 13, a piezoelectric element 14, an ultrasonic XYZ stage 15, an XYZ stage positioning portion 16, a foreign matter detecting portion 17, and the like. The nanoindenter 20 includes a probe 21, an indenter driving portion 22, a load measuring portion 23, a displacement measuring portion 24, a feedback circuit 25, the ultrasonic XYZ stage 15 common to the atomic force microscope 10, the XYZ stage positioning portion 16 common to the atomic force microscope 10, and the like.

The cantilever 11 in the atomic force microscope 10 is disposed so that a tip thereof is positioned in the neighborhood of the surface of the measuring object 1 with a distance of about several nanometers therebetween. The frequency measuring portion 12 is controlled by a CPU 26 and measures an amplitude, a phase, a frequency of oscillation of the cantilever 11 fluctuating depending on a distance between the cantilever 11 and the measuring object 1. The feedback circuit 13 drives (actuates) a vertical movement mechanism (not shown) to fluctuates the position of the cantilever 11 so that the fluctuation of the frequency and the like measured by the frequency measuring portion 12 is cancelled to provide a measured value with a constant frequency, i.e., so that the distance between the cantilever 11 and the measuring object 1 is kept at a constant level. The ultrasonic XYZ stage 15 includes an XYZ stage moved in XYZ directions with high accuracy by an ultrasonic linear motor controlled by the XYZ stage positioning portion 16 controlled by the CPU 26.

The foreign matter detecting portion 17 detects a larger projection, as a foreign matter, compared with projections and dents at the measuring object surface.

The indenter driving portion 22 in the nanoindenter 20 moves the ultrasonic XYZ stage 15 in XY directions through the XYZ stage positioning portion 16 when a foreign matter detection signal from the foreign matter detecting portion 17 which detected the foreign matter on the measuring object is inputted. By the movement of the ultrasonic XYZ stage in the XY directions, the probe 21 is located at a predetermined position. An amount of movement at this time of the ultrasonic XYZ state in the horizontal direction is recognized and stored in the CPU 26. Thereafter, the vertical movement mechanism (not shown) for the probe 21 is driven so that a tip of the probe is pressed into the measuring object surface until it reaches a predetermined position. At this time, an amount of load and an amount of displacement are measured by the load measuring portion 23 and the displacement measuring portion 24, respectively, and from measured values, an amount of movement of the probe 21 is adjusted by the feedback circuit 25 to form a dent.

A nanoindenter apparatus having a function of the atomic force microscope is also commercially available, so that it is also possible to effect the detection of the foreign matter and the dent formation by the same control mechanism. Further, the XYZ stage is also not limited to one using the ultrasonic linear motor but may also be one including a stage having a control mechanism by an encoder and a stage having a control mechanism by a piezoelectric element in combination. By the stage control through the piezoelectric element, it is possible to effect the foreign matter detection and the dent formation with high accuracy.

As the time-of-flight secondary ion mass spectrometer (TOF-SIMS), one similar to that shown in FIG. 2 can be employed. The measuring object on which the dent is formed by the nanoindenter is set in the TOF-SIMS and is impacted and scanned at its surface with primary ions from the ion gun. In the detector, a portion different in electric field from other portions is detected as the dent. A mass spectrum of the foreign matter is obtained by collecting secondary ions from a position with a predetermined horizontal distance from the dent by the detector. In the case where the spot diameter of the primary ions is larger than a diameter of the foreign matter, the mass spectrum of the foreign matter can be specifically obtained in the following manner.

Figure 5:
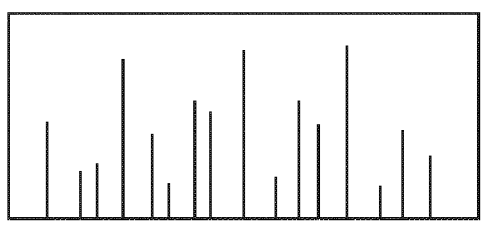
FIGS. 5(a), 5(b) and 5(c) are schematic views for illustrating the method for obtaining the mass spectrum of the foreign matter or abnormal unsmoothness in the foreign matter or abnormal unsmoothness inspection apparatus of the present invention.
Figure 5:
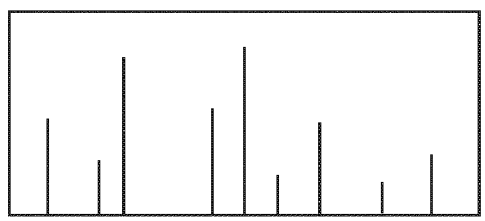
Figure 5:
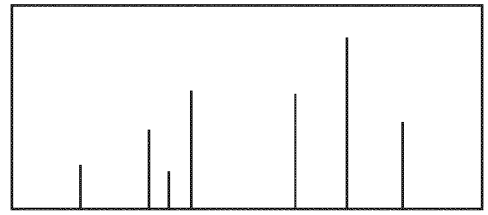

As a mass spectrum at a portion (S shown in FIG. 4) containing the foreign matter obtained from the detector of the TOF-SIMS, e.g., a mass spectrum for the foreign matter and the measuring object is obtained as shown in FIG. 5(a). As a mass spectrum for the measuring object, a mass spectrum shown in FIG. 5(b) is obtained. As a mass spectrum for the foreign matter (F shown in FIG. 4), a mass spectrum shown in FIG. 5(c) can be obtained by detecting the mass spectrum for the measuring object from the mass spectrum for the foreign matter and the measuring object. From the thus obtained mass spectrum, it is possible to perform identification and analysis of the foreign matter.

The foreign matter inspection apparatus may independently include the detecting means for detecting the foreign matter and the marking means and may also be one including the mass spectrum measuring means into which the detecting means for detecting the foreign matter and the marking means are incorporated.

Embodiment

Hereinbelow, the foreign matter inspection apparatus of the present invention will be specifically described with reference to the drawing but the scope of the present invention is not limited thereto.

In this embodiment, a nanoindenter apparatus ("Triboindenter", mfd. by Hysitron Inc.) having an atomic force microscope (AFM) function and a TOF-SIMS ("TRIFT III", mfd. by ULVAC-PHI INC.) were used.

As a measuring object, a sample was prepared by depositing a polystyrene fine particle having a diameter of 0.5 µm on a surface of an about 20 µm-thick epoxy resin film formed on a silicon wafer. This sample was used and the polystyrene fine particle was detected. On the epoxy resin film at a position distant from the polystyrene fine particle by 5 µm, a dent was formed in a depth of about 2 µm.

In the TOF-SIMS (TRIFF III), $Ga^+$ ions were used as primary ions and the measuring object was impacted with the primary ions in an area (50 µm×50 µm) in which the polystyrene fine particle and the dent was capable of entering the same field of view. Mass spectra for generated secondary ions were collected. The mass spectrum for the polystyrene fine particle was extracted by the processing shown in FIGS. 5(a) to 5(c), with the result that principally detected peaks (Mass 91 and Mass 115) were styrene-derived peaks and thus the polystyrene fine particle having a diameter of 0.5 µm was detected.

Accordingly, it is clear that identification and analysis of the foreign matter can be performed efficiently by the foreign matter inspection apparatus of the present invention.

Comparative Embodiment

With respect to the sample used in Embodiment, detection was performed by irradiating the sample with a laser beam of a wavelength of 488.0 nm by using a laser Raman analyzer ("NR-1800", mfd. by JASCO Corp.) as a detecting means. By the laser beam irradiation, breakage of the polystyrene fine particle was caused to occur, so that the polystyrene fine particle was not detected. As a result, it was impossible to perform detection of position, identification and analysis of the polystyrene fine particle. Thus, it is clear that the fine particle of 1 µm or less cannot be detected by the detection using the laser beam.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 051586/2007 filed Mar. 1, 2007, which is hereby incorporated by reference.

What is claimed is:

1. A foreign matter or abnormal unsmoothness inspection apparatus comprising:
    detecting means for detecting a foreign matter or abnormal unsmoothness by measuring smoothness of a surface of a substrate-like measuring object;
    marking means for providing a dent on the surface of the measuring object with a predetermined horizontal distance from the foreign matter or abnormal unsmoothness; and
    mass spectrum measuring means for measuring a mass spectrum of secondary ion emitted from a position with a predetermined horizontal distance from the dent by detecting the dent through impact and scanning of the surface of the measuring object with a primary ion beam.

2. An apparatus according to claim 1, wherein said detecting means is means for measuring the smoothness of the surface of the measuring object through an interatomic force.

3. An apparatus according to claim 1, wherein said marking means comprises a nanoindenter.

4. An apparatus according to claim 1, wherein said marking means provides the dent so as to be included together with the foreign matter or abnormal unsmoothness within a scanning range of the primary ion beam used for said mass spectrum measuring means.

5. An apparatus according to claim 1, wherein the primary ion beam has a spot diameter smaller than a diameter of the foreign matter or abnormal unsmoothness.

6. An apparatus according to claim 1, wherein the primary ion beam is an ion beam of a material selected from the group consisting of gold, bismuth, gallium, indium, and germanium.

7. An apparatus according to claim 1, wherein said mass spectrum measuring means comprises a data processing mechanism for analyzing the mass spectrum.

8. An apparatus according to claim 1, wherein said mass spectrum measuring means comprises a time-of-flight secondary ion mass spectrometer.

9. A foreign matter or abnormal unsmoothness inspection method comprising:
    a detecting step of detecting a foreign matter or abnormal unsmoothness by measuring smoothness of a surface of a substrate-like measuring object;
    a marking step of providing a dent on the surface of the measuring object with a predetermined horizontal distance from the foreign matter or abnormal unsmoothness; and
    a mass spectrum measuring step of measuring a mass spectrum of secondary ion emitted from a position with a predetermined horizontal distance from a dent by detecting the dent through impact and scanning of the surface of the measuring object with a primary ion beam.

* * * * *